United States Patent [19]
Kim

[11] Patent Number: 5,880,776
[45] Date of Patent: Mar. 9, 1999

[54] AUTOMATIC SWITCHING CIRCUIT OF RECORDING MODE

[75] Inventor: Ki-Yong Kim, Kunpo-shi, Rep. of Korea

[73] Assignee: SamSung Electronics Co., Ltd., Kyungki-do, Rep. of Korea

[21] Appl. No.: 928,717

[22] Filed: Aug. 13, 1992

[30] Foreign Application Priority Data

Aug. 17, 1991 [KR] Rep. of Korea .................. 91-14177

[51] Int. Cl.⁶ .......................................... H04N 7/18
[52] U.S. Cl. .............................. 348/155; 348/143; 360/5; 386/46; 386/117
[58] Field of Search ........................ 358/105, 108, 358/209; 360/5; 348/143, 155, 159, 169, 170, 207, 218, 700, 669, 701, 702; 386/46, 117; H04N 7/18

[56] References Cited

U.S. PATENT DOCUMENTS

| | | | |
|---|---|---|---|
| 4,001,881 | 1/1977 | Folsom | 360/5 |
| 4,458,266 | 7/1984 | Mahoney | 358/105 |
| 4,614,966 | 9/1986 | Yunoki et al. | 358/909 |
| 4,851,904 | 7/1989 | Miyazaki et al. | 358/108 |
| 5,027,201 | 6/1991 | Bernard | 358/105 |
| 5,091,781 | 2/1992 | An | 358/209 |
| 5,132,790 | 7/1992 | Niitsu | 358/105 |
| 5,144,661 | 9/1992 | Shamosh et al. | 358/108 |

FOREIGN PATENT DOCUMENTS 0221094  12/1984  Japan .......................... H04N 7/18

*Primary Examiner*—Richard Lee
*Attorney, Agent, or Firm*—Robert E. Bushnell, Esq.

[57] ABSTRACT

An automatic switching circuit of recording mode in an image recording and reproduction apparatus, and wherein, when the image recording apparatus is recording intermittently and movement is detected, the recording mode is automatically switched for continued recording of pictorial images. This results in the conservation of recording media and saves delaying element by performing the detection of movement in the diagonal direction of a screen.

17 Claims, 3 Drawing Sheets

AUTOMATIC SWITCHING CIRCUIT OF RECORDING MODE

BACKGROUND OF THE INVENTION

1. Field of the Invention

The present invention concerns to an automatic switching circuit of recording mode for image recording/reproducing apparatus, and more particularly to an automatic switching circuit of recording mode which, in the case of monitoring camera for recording intermittently, when motion is detected, recording mode is not only automatically switched for continued recording of pictorial images but the detection of motion is performed in oblique direction of screen.

2. Description of Prior Art

Generally, monitoring camera is widely used in various fields like those for recording situations by using in combination with video casette which can tele-record continuously images on a monitor for a long time, and for coupling image sensors to a monitor in order for video to operate automatically in accordance with the screen variations including the entry of people, and simultaneously for giving off warning sounds.

In U. S. Pat. No. 4,614,966 entitled, "Electronic still camera for generating long time exposure by adding results of multiple short time exposure", in order to prevent detection error of movement magnitude by short time exposure, a technique is introduced to prevent the detection error of movement magnitude by generating long time exposure added by data of short time exposure.

Also, U. S. Pat. No. 4,458,266, entitled "Video movement Detector" discloses a technique of detecting exact movement by dividing TV screen display into detection domain of matrix style and by integrating video signals from said domains and by detecting movement magnitude by way of comparing integrated result with previously-stored values.

However, in the conventional technical constitution as explained in the foregoing, in order to detect movement magnitude, it is inevitable to use memory, and for detection of movement magnitude by storing pixels, it has become necessary to use large capacity of memory.

Even in the case of using 1H(horizontal) retardation element CCD, the drawback of necessitating the use of large capacity of retardation element has existed for comparison between the fields.

Accordingly, it is the object of the present invention to provide automatic switching circuit of recording mode wherein, in the case of monitoring camera, intermittent recording is performed during normal times, and if movement is detected during the performance of intermittant recording, movement against 1 line of oblique direction on the screen is detected by utilizing 1H retardation element, and once movement is detected, continued recording is performed so that retardation element can be saved and simultaneously recording media can be effectively utilized.

SUMMARY OF THE INVENTION

In accordance with aspects of the present invention, there are provided various means, comprising:

pickup means for converting optical information against objects to electrical signals;

signal processing means for separating the electrical image signals of pickup means into composite image signals and luminance signals;

movement detecting means for detecting the difference between the previous field and current field against the pixel of oblique direction by receiving luminance signal from signal processing means;

comparative means for comparing movement magnitude outputted from movement detecting means with the reference value;

mode control means for switching the recording mode according to the compared value of comparative means; and recording means for recording output signal of pickup means according to the mode switched by mode control means.

BRIEF DESCRIPTION OF THE DRAWINGS

For fuller understanding of the nature and objects of the invention, reference should be made to the following detailed description taken in connection with the accompanying drawings in which.

DETAILED DESCRIPTION OF THE INVENTION

Figure 1:
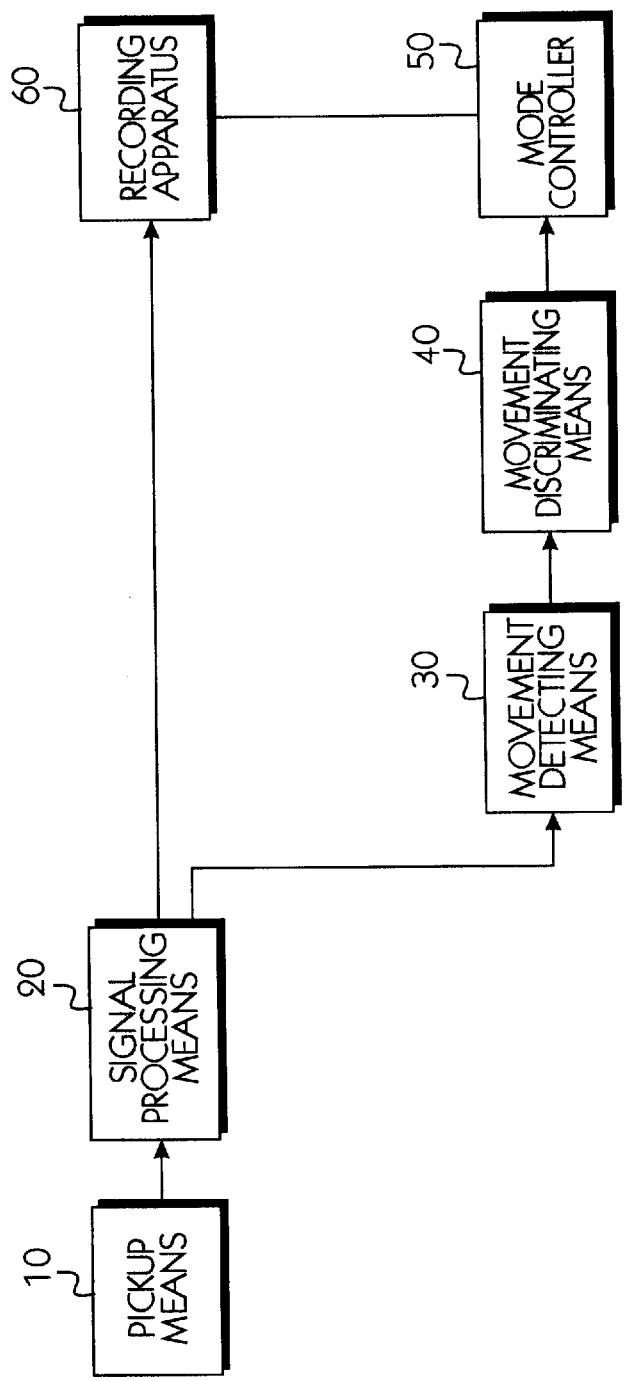
FIG. 1 is a block diagram of automatic switching circuit of recording mode in accordance with the present invention.

FIG. 1 is a block diagram of automatic switching circuit of recording mode in accordance with the present invention.

According to FIG. 1, pickup means 10 converts the optical information against the object into electrical signal.

Signal processing means 20 separates the electrical signals of pickup means 10 into composite image signal and luminance signal.

Movement detecting means 30 detects the difference between the previous field and present field against the pixel of oblique direction by receiving the luminance signal from signal processing means 20.

Movement discriminating means 40 compares the reference values and the movement magnitude outputted from movement detecting means 30.

Mode control means 50 switches recording mode by way of comparative values of movement discriminating means 40.

Recording apparatus 60 records the output signal of signal processing means 20 according to the mode switched by mode control means 50.

Figure 2:
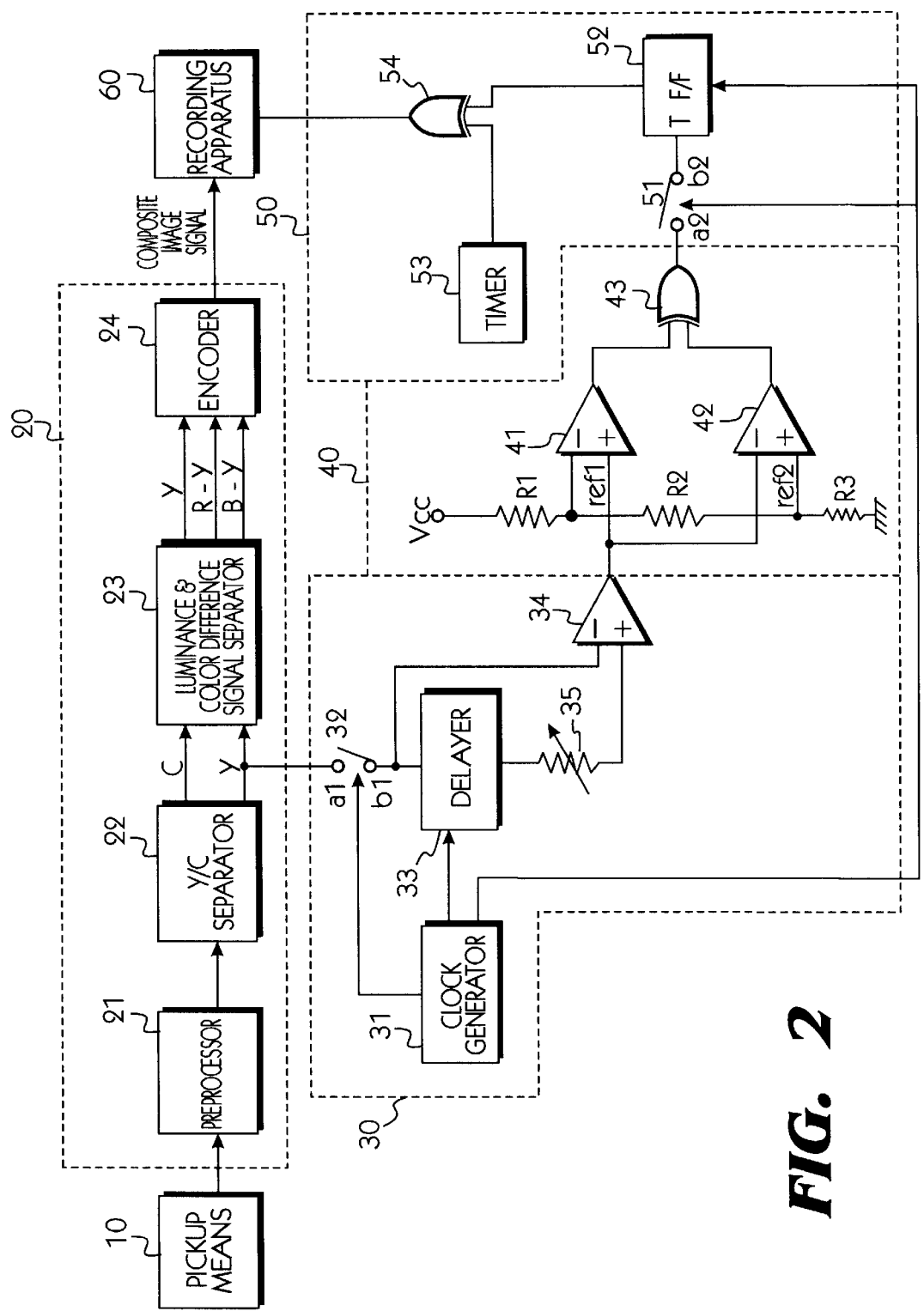
FIG. 2 is a detailed circuit drawing as shown in FIG. 1.

FIG. 2 is a detailed circuit diagram as shown in FIG. 1.

According to FIG. 2, signal processing means 20 includes:

a preprocessor 21 for extracting the genuine image signal out of the signals from pickup means 10;

a Y/C (luminance/chrominance signal) separator 22 for separating luminance signal from chrominance signal;

a luminance/color difference signal separator 23 for generating luminance signal and color difference signal by dint of luminace signal and chrominance signal;

an encoder 24 for generating composite image signal by way of luminance signal and color difference signal.

Movement detecting means 30 includes:

a clock generator 31 for generating pulses during scanning period of diagonal pixel on one sceen;

a first switch 32 for inputting luminance signal from signal processing means 20 by being switched by pulses outputted from said clock generator 31;

a delayer 33 for delaying the diagonal pixel of 1 horizontal line inputted by said first switch 32 until the diagonal pixel of next horizontal line is inputted; and an operational amplifier 34 which is a difference signal amplification means for outputting by amplification the difference between the diagonal pixel delayed by said delayer 33 and the currently-inputted diagonal pixel.

Movement discriminating means 40 includes;

first & second comparators 41, 42 which are comparative means for comparing the movement signal outputted from movement detecting means 30 with reference level; and a first gate 43 for outputting movement discriminating signal by way of the output of said first & second comparators 41, 42 when movement signal is above the reference level.

Recording mode control means 50 includes:

an intermittent tele-recording timer 53 for generating tele-recording start signal in predetermined interval;

a second switch 51 for switching the input of movement discriminating signal outputted from movement discriminating means 40 according to the pulses generated from movement detecting means 30;

signal preservation means of T F/F(Toggle Flip/Flop) 52 for preserving movement discriminating signal to prevent movement discriminating signal from being changed within the switching period; and a second gate 54 for controlling the tele-recording of recording apparatus in accordance with the outputs of said intermittent tele-recording timer 53 and T F/F(52)

Figure 3A:
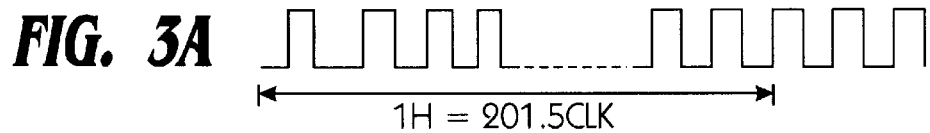
FIG. 3A–3E are waveform drawings of movement as shown in FIG. 2.
Figure 3B:
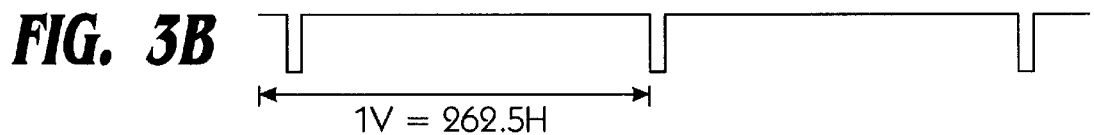
Figure 3C:
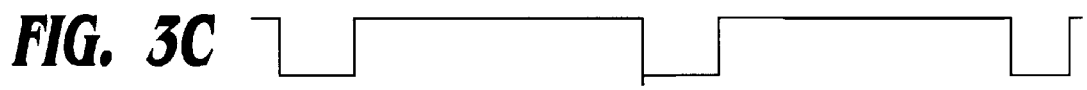
Figure 3D:
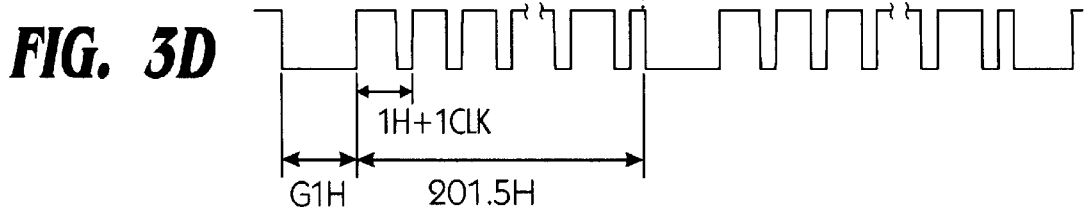
Figure 3E:
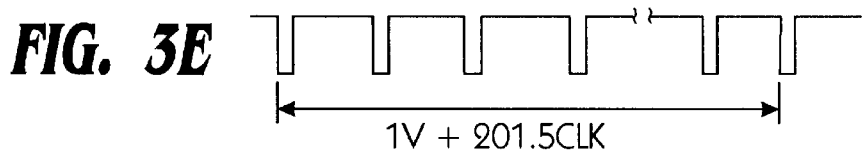
Figure 4:
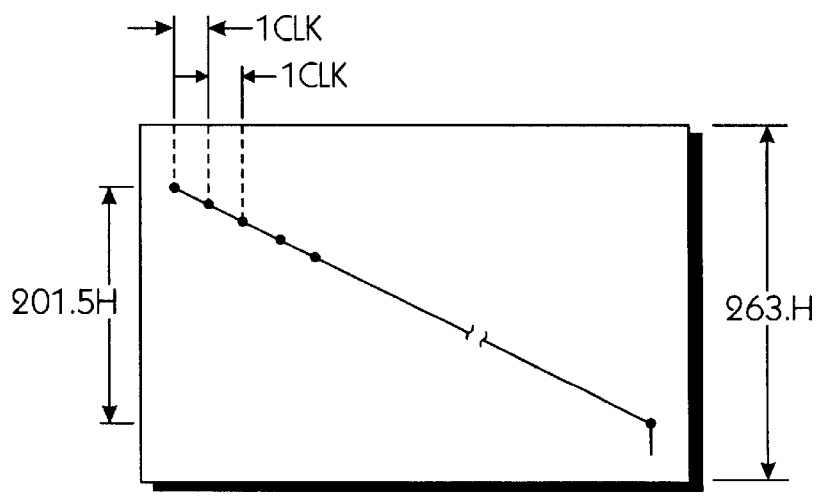
FIG. 4 is a pixel drawing of screen detected from movement detecting means adopted in FIG. 1.

With reference to the movement waveform drawings as shown in FIGS. 3A–3E and the pixel drawing of screen detected from movement detecting means 30 as shown in FIG. 4, above-mentioned construction is explained in detail as below.

The optical information against the objects incident from camera lens(not shown) extracts the charges photoelectric-converted from CCD (Charged Coupled Device) of pickup means 10.

In this location, pickup means 10 comprises CCD for converting optical information against the objects into electrical signal for accumulation and CCD driving circuit for reading out photoelectric charge accumulated for a time period corresponding to shutter speed by adding scanning pulse to each pixel of CCD.

Preprocessor 21 of signal processing means 20 performs CDS(Coefficient Double Sampling) in order to extract genuine image signal out of photoelectric-converted signals outputted from said pickup means 10.

Y/C separator 22 separates image signals outputted from said preprocessor 21 into luminance signal Y and chrominace signal C for outputting to luminance/color difference separator 23.

At this moment, luminance signal Y is also supplied to movement detecting means 30.

Said luminance/color difference separator 23 is composed of matrix and separates the output signal of Y/C separator 22 into luminance signal Y and color difference signals R-Y, B-Y.

Encoder 24 encodes said luminance signal Y and color difference signals R-Y, B-Y and outputs to recording apparatus 60 in composite image signals.

Meanwhile, the delayer 33 of movement detecting means 30 is short-circuited according to the clocks outputted from clock generator 31 and delays by 1 field the luminance signal Y of said Y/C separator 22 inputted through the first switch 32, which implies, delays by 1 vertical period.

At this point, delayer 33 is composed of 1H delaying element or a shift register, and in the case of using CCD delaying element, 1 horizontal line is 201.5 clocks and frequency is around 4 MHZ at driving clock of 1H CCD delaying element as illustrated in FIG. 3A.

At this moment, as the vertical perod, in the case of NTSC(National Television System Committee), is 525/2= 262.5H, as depicted in FIG. 3B, the blanking period from vertical driving pulse of 1V=262.5H is assumed 61H as illustrated in FIG. 3C. And as illustrated in FIG. 3D, 1H CCD driving clock is counted in 202.5 clock period for generation of driving output, thus controlling the first switch 32, delayer 33, second switch of mode controller 50 and T F/F 52, then pixel on screen increasing per 1 clock during the increase of 1 horizontal line is selected.

Furthermore, at clock generator 31, as illustrated in FIG. 3E, vertical driving pulse having 1 vertical period 1V of 201.5 clocks is generated, and first switch 31, delayer 33, second switch 51 and T F/F are controlled.

Accordingly, in the final output outputted from the delayer 33, as depicted in FIG. 4, pixel of diagonal direction on the screen is delayed by 1 vertical period for outputting, and the output signal of said delayer 33 is adjusted in level by a variable resistor 35 for input into non-inversion terminal of operational amplifier.

In inversion terminal of said operational amplifier 34, the luminance signal Y of diagonal direction of screen against the current field outputted from Y/C separator 22 of signal processing means 20 is switched to signal period by the first switch 32 as illustrated in FIG. 3D and thereafter inputted.

Accordingly, in the operational amplifier 34, the difference signal between the pixel of diagonal direction delayed by delayer 33 and the pixel of diagonal direction against the current field, in other words, the signal in accordance with the movement magnitude is amplified for output.

The difference signal outputted from said operational amplifier 34 is inputted to movement discriminating means 40.

When the difference signal is inputted to movement discriminating means 40, the outputs of said operational amplifier 34 are compared with predetermined reference levels, ref 1, ref 2, by a source voltage Vcc and resistors R1, R2, R3 at first & second comparators 41, 42.

At the first gate 43, when the signal according to the movement magnitude outputted from said operational amplifer 34 lies in between reference levels, ref 1, ref 2, the logic signal of low state is outputted. When above the reference level, ref 1 or below reference level, ref 2, logic signal of high state is outputted.

In other words, the first comparator 41 discriminates whether or not difference signal is above the reference level, ref 1 when the luminance signal value of delayed diagonal direction of pixel is larger than the luminance signal value of diagonal direction against the current field and the second comparator 42 discriminates whether or not difference signal is above the reference level, ref 2 when the luminance signal value of pixel of diagonal direction against the current field is larger than the luminance signal value of pixel of delayed diagonal direction. And accordingly, when difference signal outputted from operational amplifier 34 of movement detecting means 30 is above the reference level, ref 1, the first comparator outputs logic signal of high state, and the second comparator outputs logic signal of low state.

When the difference signal outputted from operational amplifer 34 is below the reference level, ref 2, the first comparator 41 outputs logic signal of low state and the second comparator 42 outputs logic signal of high state. At this moment, the first gate 43 outputs logic signal of high state.

In this manner, when the variation degree of screen is above the reference value, the output of first gate 43 becomes logic signal of high state, and through the second switch 51 of mode controller 50 and T F/F 52 controlled by clock generator 31 of movement detecting means 30, is supplied to the second gate 54, causing the output of second gate 54 to become logic level of high state. The output signal of second gate 54 is applied to tele-recording control terminal REC of recording apparatus 60.

Accordingly, the recording apparatus 60 records continuously the output signal of said processing means 20.

When the variation degree of screen is below the reference value, in other words, when the output of said operational amplifier 34 is below predetermined reference value, as the output of operational amplifier 34 is smaller than the reference level, ref 1 and larger than the reference level, ref 2, logic level of signal in low state is outputted from the first gate 43 and inputted to the second gate 54.

At this point, the recording apparatus 60 tele-records or does not tele-record the composite image signal outputted from signal processing means 20 according to the output signal of intermittent tele-recording set-up timer 50 in mode controller 50.

At the second gate 54 of mode controller 50, the logic level signals of high and low states are outputted by set-up interval outputted from intermittent tele-recording time set-up timer 53, and recording apparatus 60 records periodically the composite image signal outputted from encoder 24 of signal processing means 20.

In other words, assuming that set-up interval is one minute, as logic level signals of high and low states are outputted in one minute period at intermittent tele-recording timer 53, one minute of high state and one minute of low state of logic level signals are applied to tele-recording control terminal REC of recording apparatus 60 through the second gate 54, causing the recording apparatus 60 to record composite image signal in every one minute period.

At this moment, as T F/F 52 is the same as the period of first & second switches 32, 51, in order to prevent the output of first gate 43 from changing within switching period, the first switch 32 maintains the output of first gate 43, namely, the compared value of the first & second comparators 41, 42, in every switching moment.

As from the foregoing, the automatic switching circuit of recording mode in accordance with the present invention, utilizing 1H delaying element, can simplify the circuit, perform continued filming only in case of necessity and obtain the effect of saving recording media by controlling intermittent/continued recording by virtue of detection of movement, namely, the detection of the difference of pixel between the previous field and current field in diagonal direction of screen, causing the lessened capacity of delaying element.

The foregoing description of the preferred embodiment has been presented for the purpose of illustration and description. Many modifications and variations are possible in light of above teaching, and specifically by the control of pulses generated from clock generator, one line of diagonal direction detected from movement detecting means can be moved from the right upper end of screen toward the left lower end in diagonal direction, or pixel signal from upper end to any lower vertical line, or pixel signal from left to right in any horizontal line can be detected, and it will be understood by one of ordinary skill in the art that various modification can be made, without departing from the spirit and scope of the invention. Accordingly, it is not intended that the invention be limited, except as by the appended claims.

What is claimed is:

1. An automatic recording mode switching circuit of a recording apparatus comprising:

pickup means for converting optical information representing objects into an electrical image signal representative of images of the objects;

signal processing means for separating said electrical image signal of said pickup means into a chrominance signal and a luminance signal;

movement detection means for separating said luminance signal into a first component of said luminance signal and a second and subsequent component of said luminance signal after receipt of said luminance signal from said signal processing means, and for generating a difference signal by detecting differences between said first component and said second and subsequent component of said luminance signal, said movement detection means comprising:

clock generating means for generating pulses corresponding to a plurality of successive lines of pixels in one screen during a scanning period of said electrical image signal;

first switching means controlled by said clock generating means for periodically providing said luminance signal from said signal processing means;

delaying means for delaying said first component comprised of a first line of said pixels in one screen provided by said first switching means until said second and subsequent component comprised of a second line of pixels is provided by said first switching means; and difference signal amplification means for outputting and amplifying the difference signal by comparing said first component of said luminance signal delayed by said delaying means and said second and subsequent component of said luminance signal provided by said first switching means;

movement discrimination means for generating a movement discrimination signal indicating whether the images exhibit motion by comparing said difference signal with a reference value;

mode control means for controlling a recording mode of said recording apparatus to intermittently record said images when said movement discrimination signal indicates that said images exhibit no motion and to continuously record said images when said movement discrimination signal indicates that said images exhibit motion; and recording means for recording a composite image signal based upon said chrominance signal and said luminance signal while said recording mode is controlled by said mode control means.

2. An automatic recording mode switching circuit as defined in claim 1, wherein said pulses from said clock generating means are generated with each of said lines of pixels in one screen comprising a diagonal series of pixels extending obliquely across said screen.

3. An automatic recording mode switching circuit as defined in claim 1, clock generating means generating said pulses to correspond to increments of said pixels in said successive lines during each 201.5 clock period.

4. An automatic recording mode switching circuit comprising:

pickup means for converting optical information representing objects into an electrical image signal representative of images of the objects;

signal processing means for separating said electrical image signal of said pickup means into a chrominance signal and a luminance signal;

movement detection means for separating said luminance signal into a first component of said luminance signal and a second and subsequent component of said luminance signal after receipt of said luminance signal from said signal processing means, and for generating a difference signal by detecting differences between said first component and said second and subsequent component of said luminance signal;

movement discrimination means for generating a movement discrimination signal comprising:
comparative means for making a comparison of said difference signal with reference value; and
first gating means for providing said movement discrimination signal in dependence upon said comparison, said movement discrimination signal indicating whether the images exhibit motion;

mode control means for controlling a recording mode of said recording apparatus to intermittently record said images when said movement discrimination signal indicates that said images exhibit no motion and to continuously record said images when said movement discrimination signal indicates that said images exhibit motion; and recording means for recording a composite image signal based upon said chrominance signal and said luminance signal while said recording mode is controlled by said mode control means.

5. An automatic recording mode switching circuit as defined in claim 4, wherein said comparative means comprises:

first means for determining whether said difference signal is above said reference value when said first component is larger in value than said second component; and second means for determining whether said difference signal is above said reference value when said second component is larger in value than said first component.

6. An automatic record mode switching circuit as defined in claim 5, further comprising logic means for enabling recording of said images continuously when the difference signal is above said reference value.

7. An automatic recording mode switching circuit of a recording apparatus, comprising:

pickup means for converting optical information representing objects into an electrical image signal representative of images of the objects;

signal processing means for separating said electrical image signal of said pickup means into a composite image signal and a luminance signal;

clock generating means for generating pulses corresponding to a line of pixels in one screen during each scanning period of a plurality of successive scanning periods of said electrical image signal;

delaying means for delaying said luminance signal corresponding to a first line of pixels in one screen to provide a second line of pixels in a succeeding screen;

a first switch controlled by said clock generating means and periodically interrupting transmission of said luminance signal between said signal processing means and said delaying means;

difference signal amplification means for generating a difference signal by comparing said first line of pixels and said second line of pixels of said luminance signal;

discrimination means for generating a discrimination signal indicating whether the objects exhibit motion by comparing said difference signal with a reference value;

a timer for periodically generating a start signal and a stop signal;

a second switch for periodically interrupting transmission of said discrimination signal in dependence upon said pulses generated by said clock generating means;

a gate for providing a control signal in response to said discrimination signal and during intervals between said start signal and said stop signal; and means for recording said composite image signal during reception of said control signal.

8. An automatic record mode switching circuit as defined in claim 7, further comprising logic means responsive to said discrimination signal for generating a first logic signal for enabling recording of said images continuously when said difference signal is above said reference value, and generating a second logic signal for enabling said recording of said images intermittently when said difference signal is below said reference value.

9. An automatic recording mode switching circuit of a recording apparatus for enabling recording of images on record media, comprising:

means for receiving optical information representing said images to be recorded by said recording apparatus;

processor means for processing said optical information and generating composite image signals representative of said images;

motion detection means responsive to luminance components of said composite image signals, for detecting motion in said images by comparing field differences of said luminance components in each frame of said images to generate a motion detection signal indicative of whether said images exhibit motion; and recording mode control means for responding to said motion detection signal by selectively enabling said recording apparatus to make intermittent recordings of said composite image signals during a first mode of said motion detection signal and enabling said recording apparatus to make continuous recordings of said composite image signals during a second mode of said motion detection signal, said recording mode control means enabling said recording apparatus to automatically record sad composite image signals intermittently during said first mode when images stop exhibiting motion.

10. The automatic recording mode switching circuit of claim 9, wherein said processor means comprises:

preprocessor means for providing preprocessed image signals by sampling said optical information;

first separator means for separating said luminance components and chrominance components from said preprocessed image signals;

second separator means for generating color-difference signals from said luminance components and said chrominance components; and encoder means for encoding said color-difference signals to provide said composite image signals.

11. The automatic recording mode switching circuit of claim 10, wherein said recording mode control means comprises:

timer means for controlling an intermittent tele-recording time of said images by generating a tele-recording start signal during every predetermined interval;

switch means for enabling reception of said motion detection signal in accordance with clock pulses generated in correspondence with a line of diagonal pixels within each frame;

signal preservation means for preserving said motion detection signal from variations occurring during operation of said switching means; and logic means coupled to receive said tele-recording start signal and said motion detection signal, for generating a recording mode control signal to control said recording apparatus to record said composite image signals during said first mode and during said second mode.

12. An automatic recording mode switching circuit of a recording apparatus for enabling recording of images on record media comprising:

means for receiving optical information representing said images to be recorded by said recording apparatus;

processor means for processing said optical information and generating composite image signals representative of said images;

motion detection means responsive to luminance components of said composite image signals, for detecting motion in said images by comparing field differences of said luminance components in each frame of said images to generate a motion detection signal indicative of whether said images exhibit motion, said motion detection means comprising:

clock generator means for generating clock pulses in correspondence with a line of diagonal pixels in each frame during a scanning period;

first switch means controlled by said clock generator means, for receiving said luminance components of said composite image signals;

delay means for delaying said luminance components for a delay period corresponding to one line of diagonal pixels;

means for generating a difference signal by comparing differences between successive lines of diagonal pixels representing said luminance components in each frame;

comparison means for making a comparison between said difference signal with a reference signal; and first logic means for generating said motion detection signal in dependence upon said comparison, and recording mode control means for responding to said motion detection signal by selectively enabling said recording apparatus to make intermittent recordings of said composite image signals during a first mode of said motion detection signal and enabling said recording apparatus to make continuous recordings of said composite image signals during a second mode of said motion detection signal.

13. The automatic recording mode switching circuit of claim 12, wherein said comparison means comprises:

means for determining whether said difference signal is greater than said reference signal; and means for determining whether said difference signal is less than said reference signal.

14. The automatic recording mode switching circuit of claim 12, wherein said recording mode control means controls said recording apparatus to record said composite image signals intermittently during said first mode when said motion detection signal indicates that said images exhibit no motion, and controls said recording apparatus to record said composite image signals continuously during said second mode when said motion detection signal indicates that said images exhibit motion.

15. The automatic recording mode switching circuit of claim 12, wherein said recording mode control means comprises:

timer means for controlling an intermittent tele-recording time of said image by generating a tele-recording start signal during every predetermined interval;

second switch means for enabling reception of said motion detection signal in accordance with said clock pulses generated by said clock generator means in correspondence with a line of diagonal pixels within each frame;

signal preservation means for preserving said motion detection signal from variations occurring during operation of said second switch means; and second logic means coupled to receive said tele-recording start signal and said motion detection signal, for generating a recording mode control signal to control said recording apparatus to record said composite image signals during said first mode and during said second mode.

16. The automatic recording mode switching circuit of claim 12, further comprised of said recording mode control means enabling said recording apparatus to record said composite image signals intermittently during said first mode at a predetermined interval when said images exhibit no motion, and enabling said recording apparatus to record said composite image signals continuously during said second mode when said images exhibit motion.

17. The automatic recording mode switching circuit of claim 12, further comprised of said recording mode control means enabling said recording apparatus to automatically record said composite image signals intermittently during said first mode when images stop exhibiting motion.

\* \* \* \* \*